United States Patent [19]

Tjernström

[11] Patent Number: 4,978,262
[45] Date of Patent: Dec. 18, 1990

[54] TOOL COUPLING BETWEEN A TOOLHOLDER AND A MACHINE SPINDLE

[75] Inventor: Eric Tjernström, Gävle, Sweden

[73] Assignee: Sandvik AB, Sandviken, Sweden

[21] Appl. No.: 488,996

[22] Filed: Mar. 6, 1990

[30] Foreign Application Priority Data

Mar. 8, 1989 [SE] Sweden .................................. 8900808

[51] Int. Cl.$^5$ .............................................. B23B 5/26
[52] U.S. Cl. .................................... 409/233; 279/2 R; 408/239 R
[58] Field of Search ............... 409/231, 232, 233, 234; 279/2 R, 41 R, 46 R, 43, 50; 408/238, 239 R

[56] References Cited

U.S. PATENT DOCUMENTS

| | | | |
|---|---|---|---|
| 4,226,562 | 10/1980 | Schmid et al. | 409/233 |
| 4,352,612 | 10/1982 | Benatti | 409/233 |
| 4,406,195 | 9/1983 | Kruger et al. | |
| 4,565,476 | 1/1986 | Smith | |
| 4,589,808 | 5/1986 | O'Connor | 409/233 |
| 4,764,064 | 8/1988 | Grienke | 409/233 |
| 4,843,929 | 7/1989 | Anderson | |
| 4,844,671 | 7/1989 | Reinauer | 409/233 |

FOREIGN PATENT DOCUMENTS 1402301 5/1969 Fed. Rep. of Germany .
454488 5/1988 Sweden .

Primary Examiner—Daniel W. Howell
Attorney, Agent, or Firm—Burns, Doane, Swecker & Mathis

[57] ABSTRACT

A tool clamping device for machine tools comprises a draw bar that is axially displaceable inside a machine spindle and a locking element arranged in cooperation with the draw bar. The device becomes secured to a toolholder by effecting a relative movement between the draw bar and the locking element to effect a lateral displacement of the locking element into locking engagement with a shaft portion of the toolholder. Continued axial movement of the draw bar is transmitted as axial movement to the toolholder.

21 Claims, 4 Drawing Sheets

TOOL COUPLING BETWEEN A TOOLHOLDER AND A MACHINE SPINDLE

BACKGROUND AND OBJECTS OF THE INVENTION

The present invention relates to a tool clamping device for clamping a toolholder to a machine spindle.

There is a demand for reliable tool clamping devices for clamping tools in tooling machines. Usually the tool is carried by a conical portion which serves to centralize the tool in a machine spindle and to absorb the radial and axial forces that act on the tool.

There is also a demand for devices that enable tool changes to be made automatically in tooling machines.

It is, therefore, a purpose of the present invention to provide a tool clamping device that enables the transmission of much larger tensile forces than is possible with commercially available devices.

It is another purpose of the invention to provide a tool clamping device which requires less space than devices presently available.

It is an another purpose of the invention to provide such a clamping device that requires only a short axial displacement of the clamping sleeve during a tool exchange.

It is yet another purpose of the invention to provide a clamping device that comprises few parts, thus enabling a simplified construction of the device.

BRIEF DESCRIPTION OF THE DRAWINGS

The objects and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figure 1:
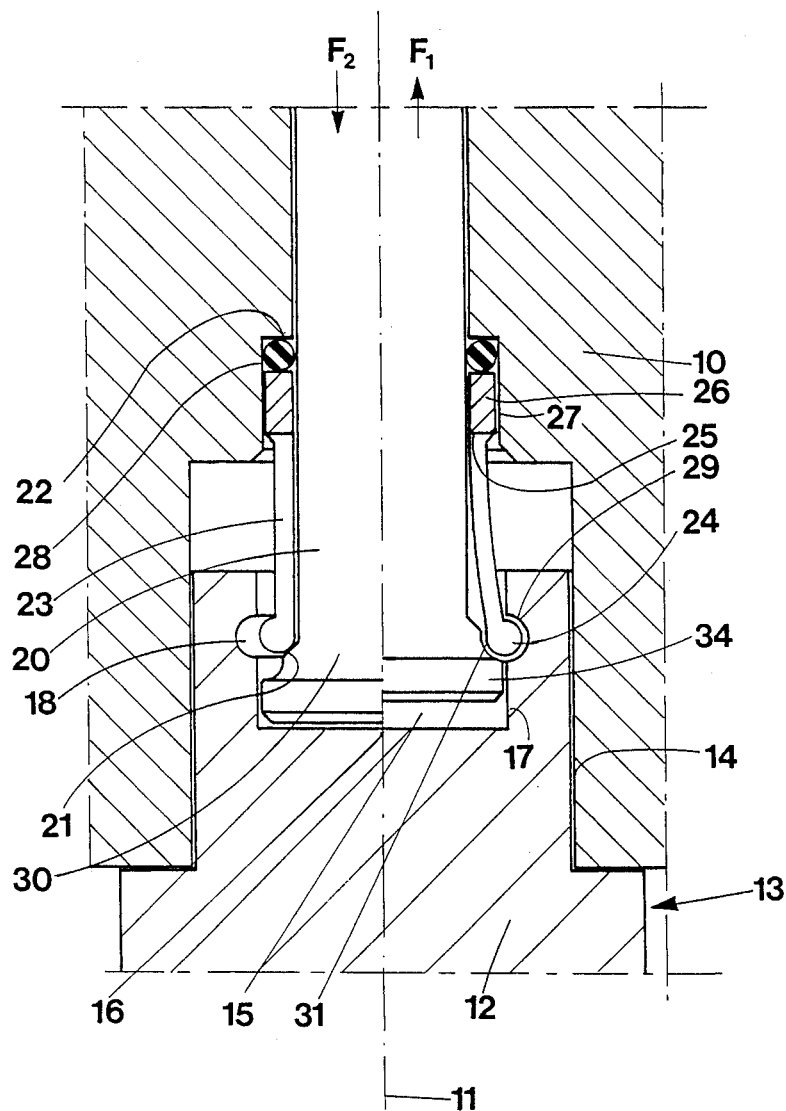
FIG. 1 is a longitudinal sectional view through a tool machine spindle and a clamping device arranged therein according to one embodiment of the invention; to the right of the center line the device is in its clamped position, and to the left of the center line the device is in its released position.

In the Figures there is shown a portion of a tool machine spindle 10. The spindle 10 is power driven in a conventional way and therefore the drive means that are used are not shown in detail. A shaft portion 12 of a toolholder 13 which is symmetrical about its central axis 11 is received in a corresponding cylindrical cavity 14 in the machine spindle 10. The shaft portion 12 is intended to carry a conventional tool (not shown) at one end thereof.

Figure 3:
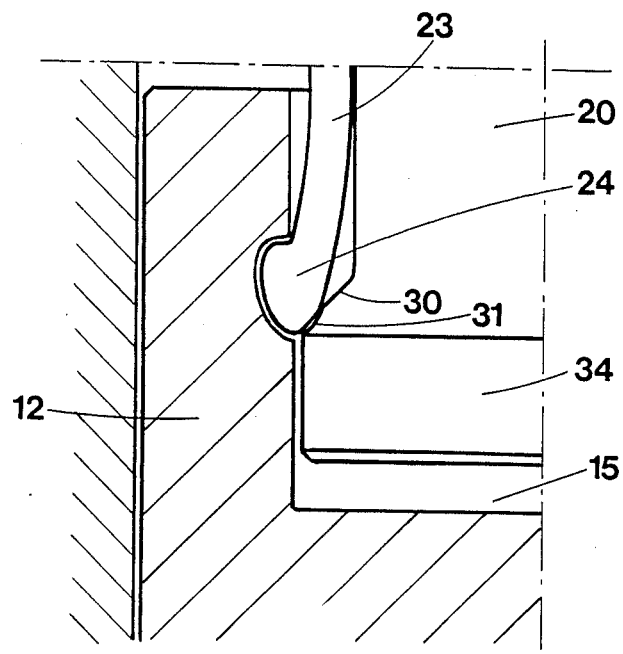
FIGS. 3-5 are views similar to FIG. 2 of further embodiments of locking elements forming part of the clamping device shown in FIG. 2.
Figure 4:
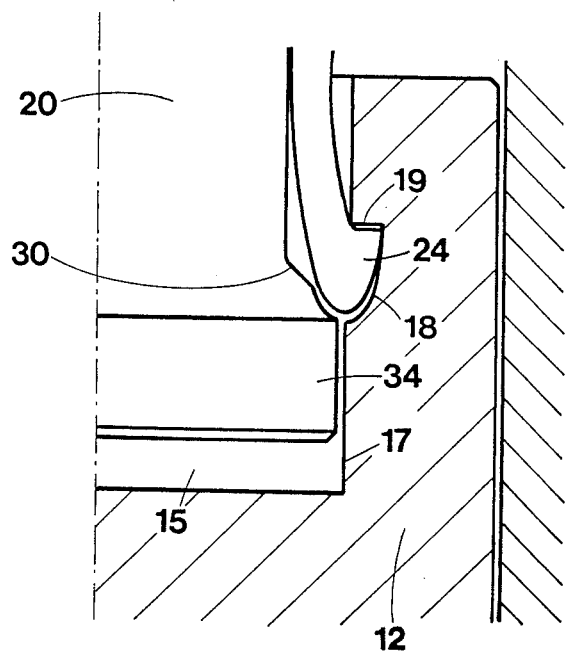
Figure 5:
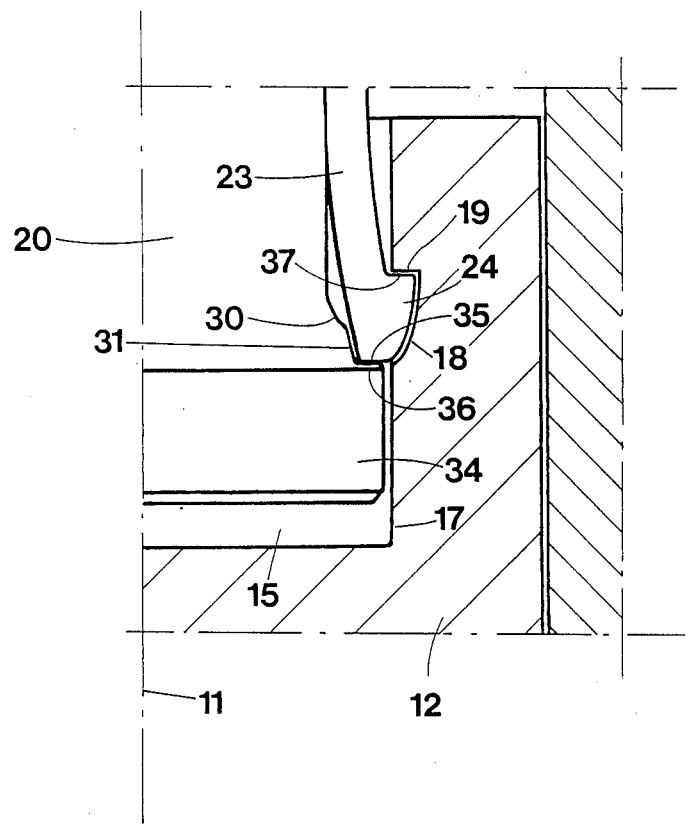

The shaft portion 12 is at its opposite end provided with a cylindrical hole 15 having a radial bottom surface 16 and an axially extending cylindrical side wall 17 in which an annular recess 18, semi-circular in cross-section, is provided. As shown in FIGS. 3-5, the recess 18 could alternatively have configurations differing from semi-circular. In FIG. 3, the elements corresponding to those of FIGS. 1-2 have the same numerals plus a suffix B. The annular recess 18B is smoothly rounded and elongated axially. The flange 24B is similarly shaped. In FIG. 4 there is shown an embodiment where the annular recess 18C has a smoothly rounded front portion which extends to a radial rear shoulder 19C. Other corresponding elements have the suffix C in FIG. 4.

A clamping device adapted for connection with the shaft portion 12 and toolholder 13 is provided inside the machine spindle. The clamping device comprises a draw bar 20, the front end of which is in the form of a radially extended shoulder portion 21. Disposed axially between a radial abutment surface 22 of the spindle, and the shoulder 21 on the draw bar 20, is a sleeve 23 which concentrically surrounds the bar 20. The front portion of the sleeve 23 is in the shape of an annular flange or bead 24 with a circularly rounded profile. When the draw bar is subjected to a force $F_1$ in a rearward direction, the annular flange 24 is cammed radially outwards by the shoulder 21 into engagement with the recess 18 in the shaft portion 13. This is made possible due to the fact that the sleeve 23 comprises a thin spring steel cylinder and has a number of axially extending slots 23' around its circumference. The slots extend rearwardly from the flange 24 to a rear point 25 on a rear ring-shaped portion 26 of the sleeve, which portion 26 is somewhat wider in cross-section than the slotted portion of the sleeve. This rear portion 26 has a constant width and is received with clearance fit in a corresponding recess 27 in the spindle while being in axial abutment against an O-ring 28, the latter abutting against the radial surface 22. The O-ring acts as a tolerance absorbing element so that precision dimensioned tolerances in the axial direction do not have to be made for the sleeve 23 and the shaft 12.

The force $F_1$ that is applied to the draw bar 20 is initially transferred as a radial force from the shoulder portion 21 to the annular flange 24 of the sleeve 23 and thereafter is transferred as an axial force from the flange 24 to a rear point 29 of the shaft portion 12. There is consequently no transmission of the force $F_1$ axially to the toolholder until the locking flange has entered the recess 18. The shoulder portion 21 which forces the flange 24 radially outwards and into the annular recess 18 comprises two axially adjacent surfaces 30, 31, namely a beveled surface 30, inclined in relation to the central axis 11, and a radially outer surface 31 that preferably has a circularly rounded formation. The outer surface 31 extends radially outwardly relative to the inner surface 30. The beveled surface 30 is intended to act as a cam surface which cams the flange 24 from a radially inward position to a radially outward position. The outer surface 31 is intended to act as a locking surface against which the locking flange 24 of the sleeve 23 abuts when coupled to the shaft 12; thus, the locking surface locks the flange 24 in the radially outward position.

It is important that the outer surface 31 have a smoothly rounded profile which as closely as possible matches the profile of the annular flange 24. This ensures the establishment of the largest possible contact surface which, in turn, means a desirable low surface pressure. It is also important that the outer surface 31, the annular locking flange 24, and the annular recess 18 are made of a hardened material which makes it easier to maintain desired dimensions of the device.

Figure 2:
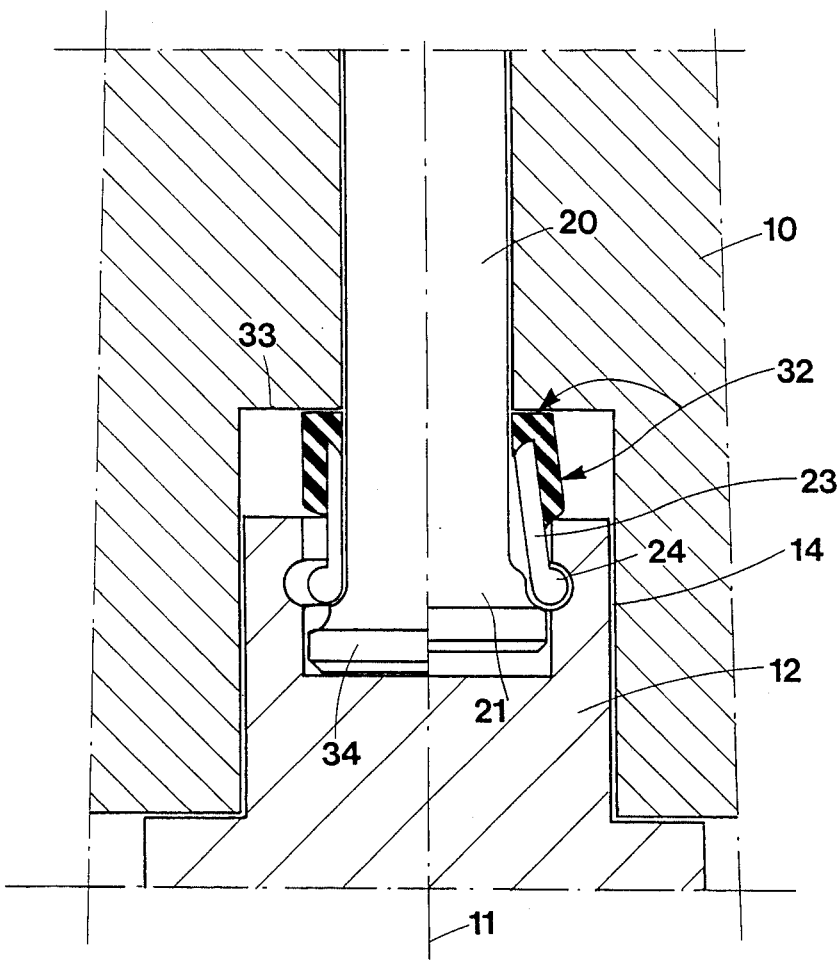
FIG. 2 is a longitudinal sectional view of another embodiment of the clamping device of the invention wherein the clamping sleeve is composed of an elastomer vulcanized to metal segments.

In FIG. 2, there is shown an alternative embodiment of the device in which the clamping sleeve 23A comprises a front end portion in the form of a circular extension 24 that is integral with the slotted portion of the sleeve, whereas the upper portion of the sleeve comprises a resilient member 32 formed of an elastomeric material such as rubber or any suitable synthetic material which is vulcanized to the slotted portion. The resilient member defines a rear end 31' of the sleeve arranged to contact a radial abutment surface 33. The resilient portion 32 is expandable radially outwardly when the coupling force $F_1$ is applied to the draw bar 20 in order to secure the shaft portion 12 to the machine spindle 10. The resilient member 32 will contract the slotted portion of the sleeve radially inwardly when the draw bar is subjected to the release force $F_2$. Due to the provision of an axially slotted clamping sleeve comprised of a resilient member vulcanized to metal segments, it is ensured that during a clamping step the deformations occur in the elastomer, whereby fatigue of the material due to displacement of the metal segments occurs only in the elastomer which is highly resistant to fatigue failure. The rubber promotes contraction of the sleeve, and serves as a tolerance absorbing unit.

In order to subject the draw bar 20 in FIGS. 1-2 to a good centering and guidance axially in the hole 15, the outer mantle surface of the shoulder portion 21 has been formed as a cylindrical guiding surface 34 arranged to be guided with clearance fit within the axially extending hole wall 17 in the hole 15. When there is a need for an exchange of tools, the draw bar 20 is activated by a release force $F_2$ sufficiently large to press the bar 20 and its shoulder portion 21, forwardly to the position shown to the left of the center line 11 in FIG. 1, whereupon the flange 24 snaps radially inwardly to its release position. The outer diameter of the locking flange 24 when in a radially inward position is selected such that the shaft portion 12 can be released axially from the draw bar 20 to enable the desired exchange of tools. As appears from FIGS. 1 and 2 the shoulder portion 21 of the draw bar 20 is brought to a position where its end surface abuts the bottom surface 16 of the hole 15 when the force $F_2$ acts upon the draw bar, as shown to the left of the center line 11 whereby the draw bar 20 acts as a pushing-out member which pushes out the toolholder 13.

In FIG. 5 there is shown an alternative embodiment wherein the annular recess 18D has the same configuration as in FIG. 4. Hence, the rear axial abutment for the locking flange 24D is provided by a radial shoulder 19D, whereas the radially interior surface of the front portion of the clamping sleeve 23D comes into surface contact with the locking surface 31D of the shoulder 21D. The surface 31D extends radially outwardly of the beveled cam surface 30D and is inclined in relation to the center line 11D. The front end portion of the locking flange 24D is in the form of a flat radial support surface 35D which is brought into contact with a flat radial surface 36D on the draw bar 20D. The surface 36D is oriented parallel to an upper support surface 37D of the locking flange 24D which is intended for abutment against the radial shoulder 19D.

Due to the fact that, according to the present invention, no axial force transmission to the shaft 12 occurs when the locking sleeve 23, 23A, 23B, 23C or 23D is undergoing a relative radial movement in relation to the locking recess 18, the requirements of dimensional tolerance and surface finish are very low and, therefore, it is not necessary to perform any grinding of the surfaces.

The tool clamping device has been described when used in a machine spindle with a rotary tool. It is to be understood, however, that the invention is also useful for the purpose of connecting a stationary turning tool with a correspondingly machining tool machine.

Although the present invention has been described in connection with preferred embodiments of the present invention, it will be appreciated by those skilled in the art that additions, modifications, deletions, and substitutions not specifically described may be made without departing from the spirit and scope of the invention as defined in the appended claims.

What is claimed is:

1. A tool clamping device for clamping a toolholder to a machine spindle, said machine spindle including a cavity into which a shaft portion of a toolholder is to be inserted, said clamping device comprising:
    a draw bar axially displaceable in said cavity and including a radially extending shoulder portion at an axially forward end thereof, said shoulder portion including an inclined cam surface and a locking surface disposed axially forwardly of and extending radially outwardly of said cam surface, and
    a clamping sleeve extending around said draw bar such that said draw bar is axially reciprocal relative to said sleeve, a forward end of said sleeve including radially outwardly projecting locking flange means movable between a radially inward position permitting entry of a toolholder shaft into said cavity and a radially outward position in which said locking flange means enters a recess of the toolholder shaft,
    said draw bar being movable axially rearwardly relative to both said cavity and said locking sleeve such that said cam surface cams said forward end of said locking sleeve from said radially inward position to said radially outward position and thereafter said locking surface abuts said forward end to lock said forward end in said radially outward position.

2. A tool clamping device according to claim 1, wherein said locking sleeve includes circumferentially spaced, axial slots extending rearwardly from said forward end of said sleeve.

3. A tool clamping device according to claim 2, wherein a rear portion of said sleeve is of one-piece construction with a portion of said sleeve containing said slots.

4. A tool clamping device according to claim 3, wherein said rear portion is radially larger than said portion of said sleeve containing said slots, a resilient O-ring disposed axially between said rear portion and a rear end of said cavity.

5. A tool clamping device according to claim 2, wherein a rear portion of said sleeve comprises an elastomeric member, and said locking flange means is formed of a plurality of metal pieces bonded to said elastomeric member and spaced apart by said slots.

6. A tool clamping device according to claim 5, wherein said elastomeric member abuts a rear end of said cavity.

7. A tool clamping device according to claim 1, wherein an axially forward end of said locking flange is curved and an axially rear end thereof extends radially.

8. A tool clamping device according to claim 7, wherein said locking surface is inclined relative to the axis and abuts against a correspondingly inclined portion of said locking sleeve.

9. A tool clamping device according to claim 8, wherein an included angle formed between said abutment surface and the axis is smaller than an included angle formed between said cam surface and the axis.

10. A tool clamping device in combination with a toolholder, said clamping device clamping a shaft of said toolholder in a cavity of a machine spindle:

said shaft being axially insertable into said cavity and including an axially rearwardly open hole and an annular recess formed in a wall of said hole, said clamping device including:

a draw bar axially displaceable in said cavity and said hole and including a radially extending shoulder portion at an axially forward end thereof, said shoulder portion including an inclined cam surface and a locking surface disposed axially forwardly of and extending radially outwardly of said cam surface, and a clamping sleeve extending around said draw bar such that said draw bar is axially reciprocal relative to said sleeve, a forward end of said sleeve including radially outwardly projecting locking flange means movable between a radially inward position permitting entry of said toolholder shaft into said cavity and a radially outward position in which said locking flange means enters said recess of said shaft, said draw bar being movable axially rearwardly relative to said cavity and said locking sleeve such that said cam surface cams said forward end of said locking sleeve from said radially inward position to said radially outward position and thereafter said locking surface abuts said forward end to lock said forward end in said radially outward position such that continued axially rearward movement of said draw bar pulls said toolholder axially against said machine spindle.

11. A combination according to claim 10, wherein a cross-sectional shape of said recess comprises a portion of a circle, said locking flange means being correspondingly shaped.

12. A combination according to claim 10, wherein said draw bar is displaceable forwardly relative to said locking sleeve and said shaft to unlock said locking flange and contact an axially forward wall of said hole to push said toolholder away from said machine spindle.

13. A combination according to claim 10, wherein said shoulder portion includes a cylindrical mantle surface disposed axially forwardly of said locking surface, said mantle surface being slidable with a clearance fit within said hole.

14. A combination according to claim 10, wherein a cross-sectional shape of said recess is axially elongated, said locking flange means being correspondingly shaped.

15. A combination according to claim 14, wherein an axially forward end of said recess is curved and a rear end thereof extends radially, said locking flange means being correspondingly shaped.

16. A combination according to claim 10, wherein said locking surface is inclined and abuts against a correspondingly inclined portion of said locking sleeve.

17. A combination according to claim 16, wherein an included angle formed between said abutment surface and the axis is smaller than an included angle formed between said cam surface and the axis.

18. A combination according to claim 10, wherein said draw bar includes a radial surface interconnecting an axially forward end of said abutment surface and an axially rear end of said mantle surface, said locking flange means including a radially extending forward surface which is engageable with said radial surface of said draw bar.

19. A combination according to claim 18, wherein an axially rear end of said recess extends radially and an axially rear end of said locking flange means which engages said rear end of said recess also extends radially.

20. A combination according to claim 10, wherein said locking sleeve includes circumferentially spaced, axial slots extending rearwardly from said forward end of said sleeve.

21. A combination according to claim 20, wherein a rear portion of said sleeve comprises an elastomeric member, and said locking flange means is formed of a plurality of metal pieces bonded to said elastomeric member and spaced apart by said slots.

* * * * *